June 2, 1942.  L. T. ROBERTON  2,285,230
LAWN MOWER
Filed Oct. 17, 1940  3 Sheets-Sheet 1

INVENTOR.
Lloyd T. Roberton
BY  Duerler & French
ATTORNEYS

June 2, 1942.　　　L. T. ROBERTON　　　2,285,230
LAWN MOWER
Filed Oct. 17, 1940　　　3 Sheets-Sheet 2

INVENTOR.
Lloyd T. Roberton
BY Marks & French
ATTORNEYS

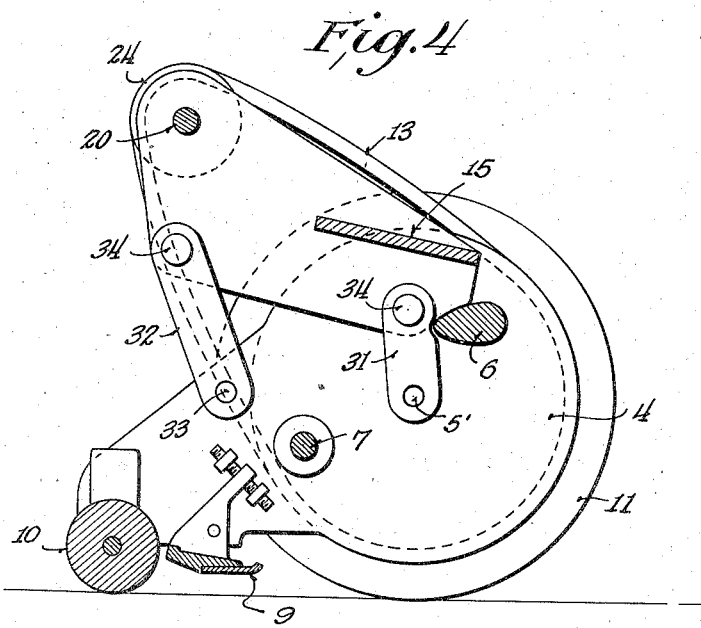
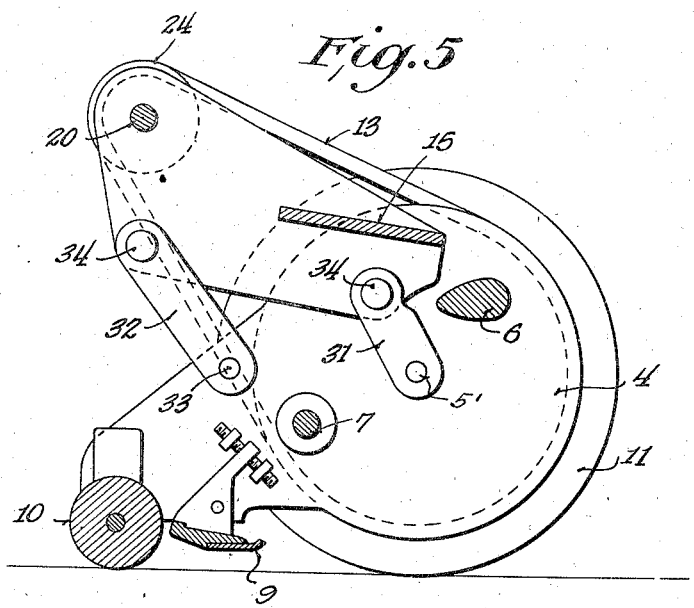

Patented June 2, 1942

2,285,230

UNITED STATES PATENT OFFICE 2,285,230

LAWN MOWER

Lloyd T. Roberton, Michigan City, Ind., assignor to Roberton Manufacturing Company, Michigan City, Ind., a corporation of Indiana Application October 17, 1940, Serial No. 361,527

4 Claims. (Cl. 56—26)

The invention relates to lawn mowers and more particularly to power driven lawn mowers.

In power driven lawn mowers, the reel or cutting blade is usually constantly driven and the propelling wheels are adapted to be connected to the motor through some kind of a releasable clutch drive connection. The clutch drive connections that have been used heretofore have not been satisfactory, and the object of the present invention is to provide an arrangement under the control of the operator for driving the propelling wheels of the mower merely by swinging the motor carrying frame about the reel center from a release to a driving position.

The invention further consists in the several features hereinafter set forth and more particularly defined by claims at the conclusion hereof.

In the drawings:

Fig. 4 is a detailed sectional view similar to Fig. 3 showing certain modifications of the drive control in a release position;

Fig. 5 is a detailed sectional view similar to Fig. 4 showing the parts in a driving position.

Figure 1:
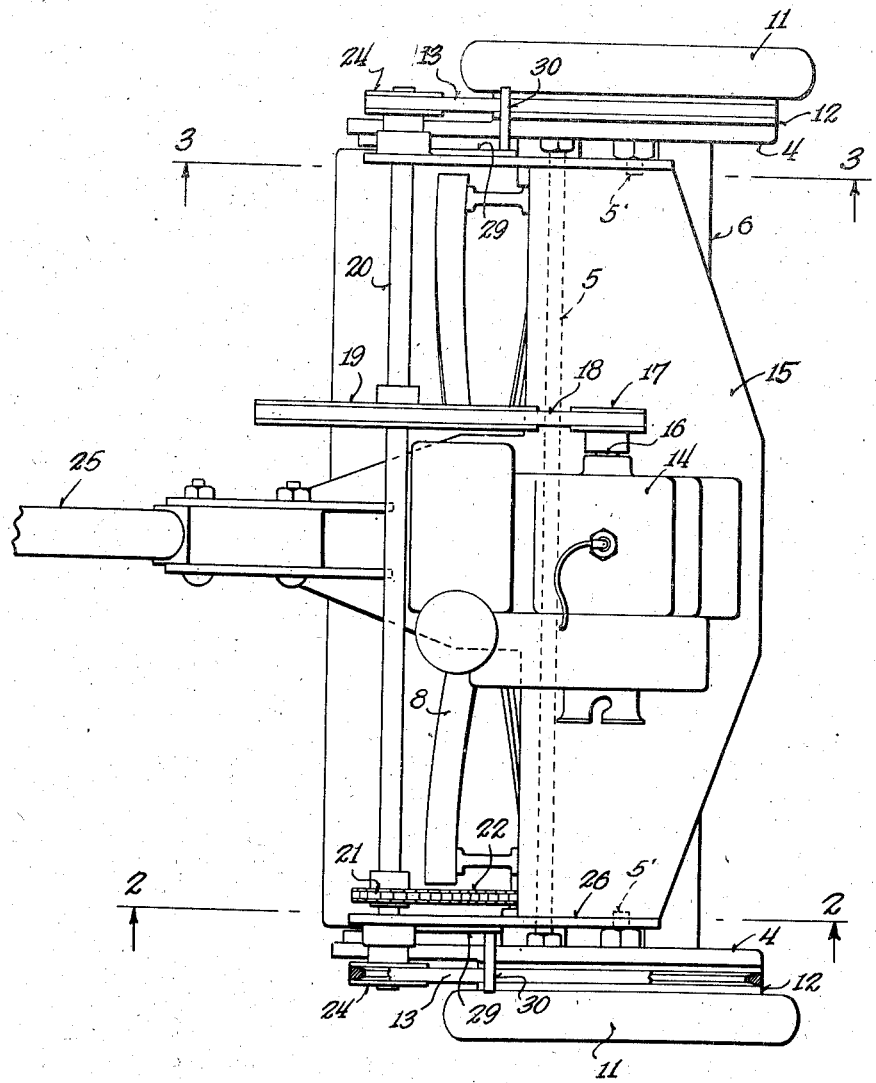
Fig. 1 is a plan view of a lawn mower embodying the invention.

Referring to the drawings, the lawn mower embodying the invention has the usual side frame members 4 which are provided with stub axles 5' and connected together by tie bars 5 and 6, and a reel shaft 7 upon which the reel or cutting blade 8 is rotatably mounted, said reel cooperating in known manner with the adjustably mounted fixed blade 9, the frame being mounted on a rear roller 10 and propelling wheels 11, each provided with a grooved pulley 12 engaged by flexible driving belt 13, here shown as a V-belt.

A prime mover 14, here shown as an internal combustion engine, is mounted on a supporting frame 15 with its drive or crank shaft 16 connected by a pulley 17 and belt 18 to a speed reduction pulley 19 on a lay shaft 20. The shaft 20 carries a sprocket 21 connected by a chain 22 to a sprocket 23 on the hub of the reel 8, the arrangement being such as to drive the reel 8 from the prime mover at a suitable cutting speed. The lay shaft 20 also has grooved pulleys 24 mounted thereon, each of which cooperates with its belt 13 to drive the wheels 11 from the prime mover, the ratios of the pulley 12 and 24 being such as to turn said wheels 11 at a speed such that an operator may readily walk behind the mower and steer the same through the use of a long handle 25.

The supporting frame 15 is mounted so as to swing about the reel shaft 7 as a center, and while it might be directly pivotally mounted on the reel shaft, I prefer to relieve this shaft of the weight of said frame and engine by providing bracket arms 26, each having curved slots 27 and 28 therein laid out with the reel shaft as a center and through which the frame bar 6 and axles 5' of the main frame pass.

Figure 3:
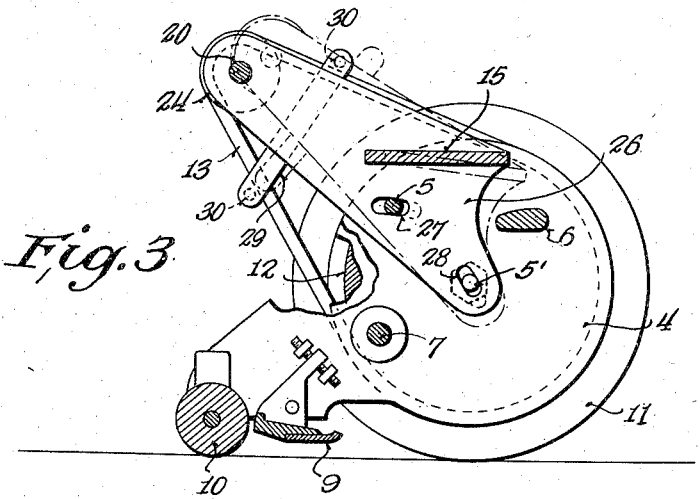
Fig. 3 is a detailed sectional view taken on the line 3—3 of Fig. 1.

With this construction as the supporting frame 15 is moved in a clockwise direction relative to its center 7, the shaft 20 and belt 13 are shifted from their full to their dotted line position, and in their dotted line position the center of the shaft 20 has come closer to the center of the wheels 11 with the result that the belts 13 are loosened so that they simply run idly over the pulleys 12. When, however, the frame 15 is swung downwardly into the full line position of Fig. 3, the distance between shaft 20 and the centers of the propelling wheels increases so that the belts 13 are tightened into driving engagement with the pulleys 12. Swinging of the frame 15 about the mower frame does not in any way effect the drive of the blade 8 and chain 22 since its shaft 7 is the center of rotation of the frame 15.

The swinging of the frame 15 is, as previously noted, affected by the operator through his raising or lowering of the handle 25 which also provides for his control of the steering of the mower.

To prevent the belts 13 from jumping the pulleys 24, when released, each belt is provided with a holder or intermediate guard formed by a bar 29 and a pair of spaced pins 30 between which the belt 13 runs.

Figure 2:
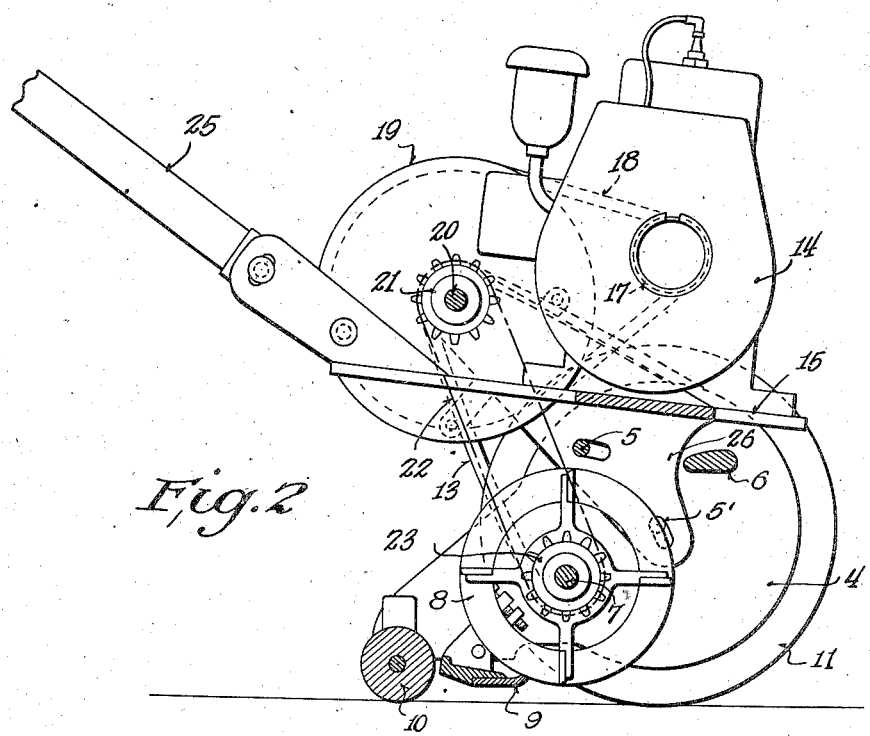
Fig. 2 is a detailed sectional view taken on the line 2—2 of Fig. 1.

Instead of the above described pivotal mounting of the plate I may connect the supporting frame 15 to the main frame 4, as shown in Figs. 4 and 5, by means of spaced links 31 and 32, the length and spacing of these links being such that the frame 15 swings substantially about the reel shaft 7 as a center. With the above construction the short link 31 may be pivoted at one end on the wheel axle stud 5' and the longer link 32 pivoted on one end on a stud 33 mounted on the main frame 4. The other ends of the links 31 and 32 are pivotally connected to suitable pivot studs 34 on the supporting frame 15. The frame 15 has, of course, been modified over that shown in Figs. 2 and 3 so as to accommodate the links 31 and 32, and the links 32 and frame 15 have been recessed as shown in Fig. 4 to accommodate the tie bar 6 which also acts as a stop for the forward swinging release position of said frame. The other parts of the structure shown in Figs. 4 and 5 are similar to similarly referenced parts of Figs. 2 and 3. As in the first described construction upward swinging of the frame 15 through the handle 25, which frame carries the prime mover 14, causes the belt 13 to loosen relative to the wheel pulley 12, as shown in Fig. 4, while downward swinging or tilting of the guiding handle 25 causes the belt 13 to become tightened so as to drive the pulley 12 from the shaft 20 which is being constantly driven, as shown in detail in Fig. 2, by the prime mover 14.

From the foregoing it will be noted that I have provided for the connection and disconnection of the power from the traction wheels merely by the swinging of the motor and its drive shaft relative to said traction wheels.

I desire it to be understood that this invention is not to be limited to any particular form or arrangement of parts except in so far as such limitations are included in the claims.

What I claim as my invention is:

1. In a lawn mower having a propelling wheel and a rotating reel arranged in fixed relation to each other, of power operated means for driving said wheel comprising a supporting frame mounted to swing about the center of rotation of said reel, a prime mover mounted on said frame, and means for drivingly connecting said prime mover with said wheel comprising a belt drive connection including a pulley on said frame and a pulley associated with said wheel with a belt therebetween, the tension of said belt being under the control of the operator through the swinging of said frame relative to the center of said reel.

2. In a lawn mower having a propelling wheel and a rotating reel arranged in fixed relation to each other, of power operated means for driving said reel and wheel comprising a supporting frame mounted to swing about the center of rotation of said reel, a prime mover mounted on said frame, a shaft on said frame driven by said prime mover, a continuous drive connection between said shaft and said reel, and a belt drive connection between said shaft and said propelling wheel and controlled by the operator through the swinging of said supporting frame relative to the center of said reel.

3. In a lawn mower having a main frame including a wheel axle member and a tie bar spaced therefrom, a propelling wheel and a rotating reel arranged in relatively fixed relation to each other, of power operated means for driving said wheel comprising a supporting frame mounted to swing on said axle member and tie bar relative to the center of rotation of said reel as a center, a prime mover mounted on said supporting frame, and means for drivingly connecting said prime mover with said wheel comprising a belt drive connection including a pulley on said supporting frame and a pulley associated with said wheel with a belt therebetween, the tension of said belt being under the control of the operator through the swinging of said supporting frame relative to the center of said reel.

4. In a lawn mower having a main frame, a propelling wheel and a rotating reel arranged on said frame in relatively fixed relation to each other, of power operated means for driving said wheel comprising a supporting frame, link connections between said main frame and supporting frame permitting swinging of said supporting frame substantially about the center of rotation of said reel as a center, a prime mover mounted on said supporting frame, and means for drivingly connecting said prime mover with said wheel comprising a belt drive connection including a pulley on said supporting frame, and a pulley associated with said wheel with a belt therebetween, the tension of said belt being under the control of the operator through the swinging of said supporting frame relative to the center of said reel.

LLOYD T. ROBERTON.